(12) United States Patent
Jung et al.

(10) Patent No.: US 8,924,058 B2
(45) Date of Patent: Dec. 30, 2014

(54) APPARATUS AND METHOD FOR MONITORING BELT SLIP IN BELT-TORQUE ASSISTANCE SYSTEM

(75) Inventors: Minyoung Jung, Hwaseong-si (KR); Sejun Kim, Seoul (KR); Jiyong Yu, Pocheon-si (KR); Junyong Lee, Hwaseong-si (KR); Daekwang Kim, Hwaseong-si (KR); Chikung Ahn, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 230 days.

(21) Appl. No.: 13/528,116

(22) Filed: Jun. 20, 2012

(65) Prior Publication Data

US 2013/0131899 A1 May 23, 2013

(30) Foreign Application Priority Data

Nov. 21, 2011 (KR) .......................... 10-2011-0121721

(51) Int. Cl.
| | |
|---|---|
| *B60K 6/20* | (2007.10) |
| *B60K 6/485* | (2007.10) |
| *F16H 57/01* | (2012.01) |
| *B60W 10/08* | (2006.01) |
| *B60W 30/186* | (2012.01) |
| *B60W 20/00* | (2006.01) |
| *F16H 7/02* | (2006.01) |

(52) U.S. Cl.
CPC ................ *B60K 6/485* (2013.01); *F16H 57/01* (2013.01); *B60W 10/08* (2013.01); *B60W 30/186* (2013.01); *B60W 20/50* (2013.01); *F16H 7/02* (2013.01); *F16H 2057/014* (2013.01); *Y02T 10/6226* (2013.01); *B60W 2510/0241* (2013.01); *B60W 2710/083* (2013.01)

USPC .............................................. 701/22; 475/208

(58) Field of Classification Search
USPC .......... 701/22; 180/65.1, 65.21, 65.265, 65.6; 475/208, 210; 474/69–71
See application file for complete search history.

(56) References Cited

U.S. PATENT DOCUMENTS

| | | | |
|---|---|---|---|
| 6,803,747 B2* | 10/2004 | Taniguchi et al. | 322/28 |
| 7,102,246 B2* | 9/2006 | Scherrbacher et al. | 290/40 R |
| 8,112,193 B2* | 2/2012 | Yurgil | 701/33.8 |
| 8,527,142 B2* | 9/2013 | Bacon | 701/36 |
| 2008/0021603 A1 | 1/2008 | Zettel et al. | |
| 2013/0172137 A1* | 7/2013 | Antchak et al. | 474/133 |

FOREIGN PATENT DOCUMENTS

| | | |
|---|---|---|
| JP | 10-150742 A | 6/1998 |
| JP | 2001-197615 A | 7/2001 |

(Continued)

*Primary Examiner* — Dalena Tran
(74) *Attorney, Agent, or Firm* — Morgan, Lewis & Bockius LLP

(57) ABSTRACT

An apparatus for monitoring belt slip in a belt-torque assistance system includes a motor-alternator slip control unit that determines whether the belt connecting the motor-alternator with the engine in accordance with driving modes of a vehicle slips, and restricts operation of the motor-alternator in accordance with the slip of the belt, an ECU that outputs the operation state of the engine to the motor-alternator slip control unit, an inverter that changes an alternate current generated from the motor-alternator into a direct current or a direct current into an alternate current to drive the motor-alternator, and outputs a signal according to the speed of a rotor and power generation load to the motor-alternator slip control unit, and a motor-alternator operation control unit that operates the motor-alternator to generate power from the driving power transmitted from the engine and to assist torque of the engine.

8 Claims, 6 Drawing Sheets

(56) References Cited

FOREIGN PATENT DOCUMENTS

| | | |
|---|---|---|
| JP | 2003-70103 A | 3/2003 |
| JP | 2008-179242 A | 8/2008 |
| KR | 10-2004-0108172 A | 12/2004 |
| KR | 10-2005-0060835 A | 6/2005 |
| KR | 10-0802723 B1 | 2/2008 |
| KR | 10-0951980 B1 | 4/2010 |
| KR | 10-1039679 B1 | 6/2011 |

* cited by examiner

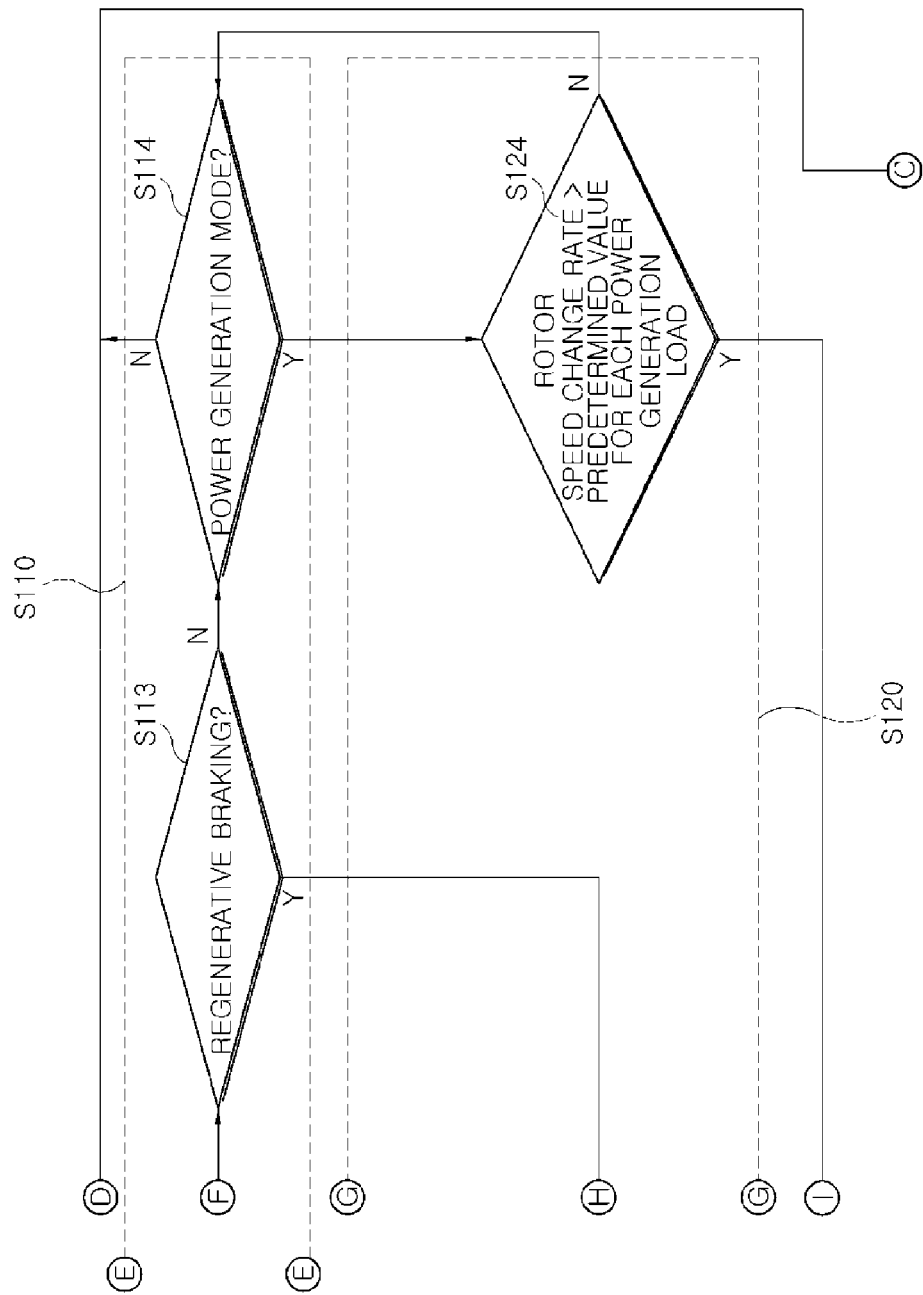

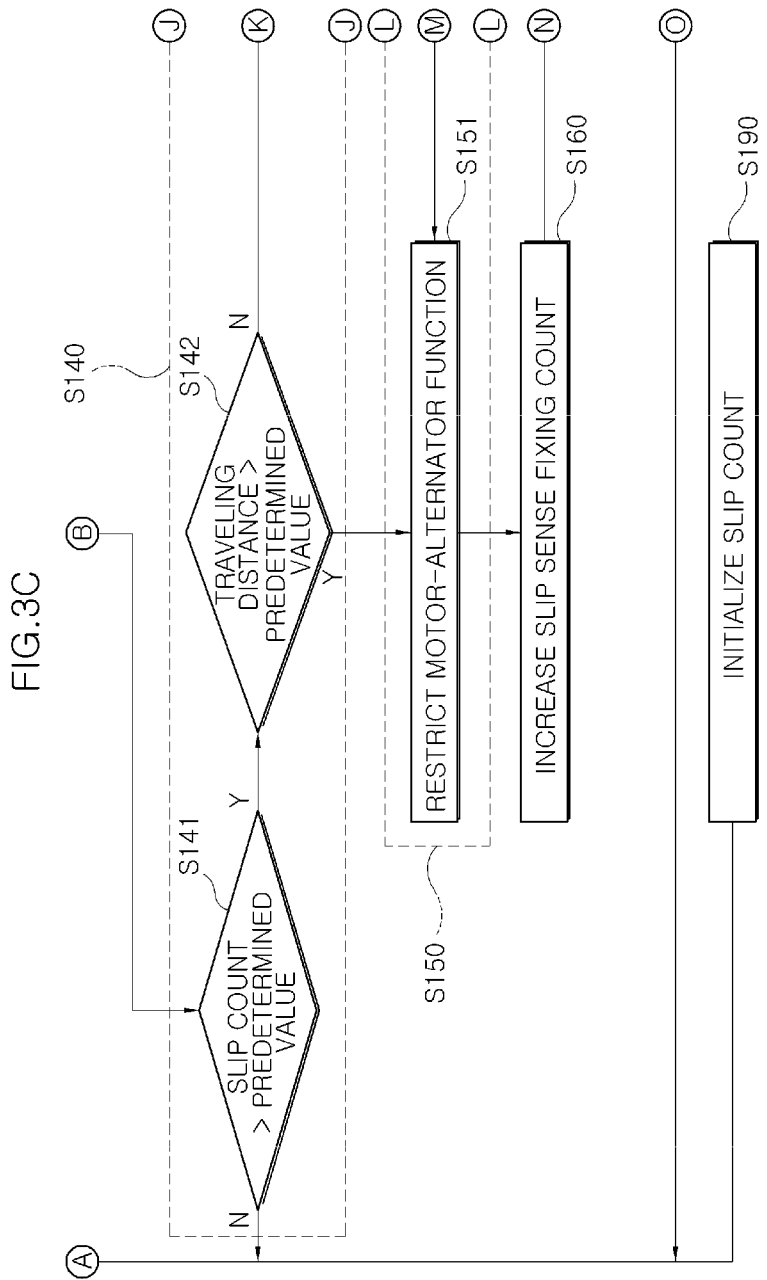

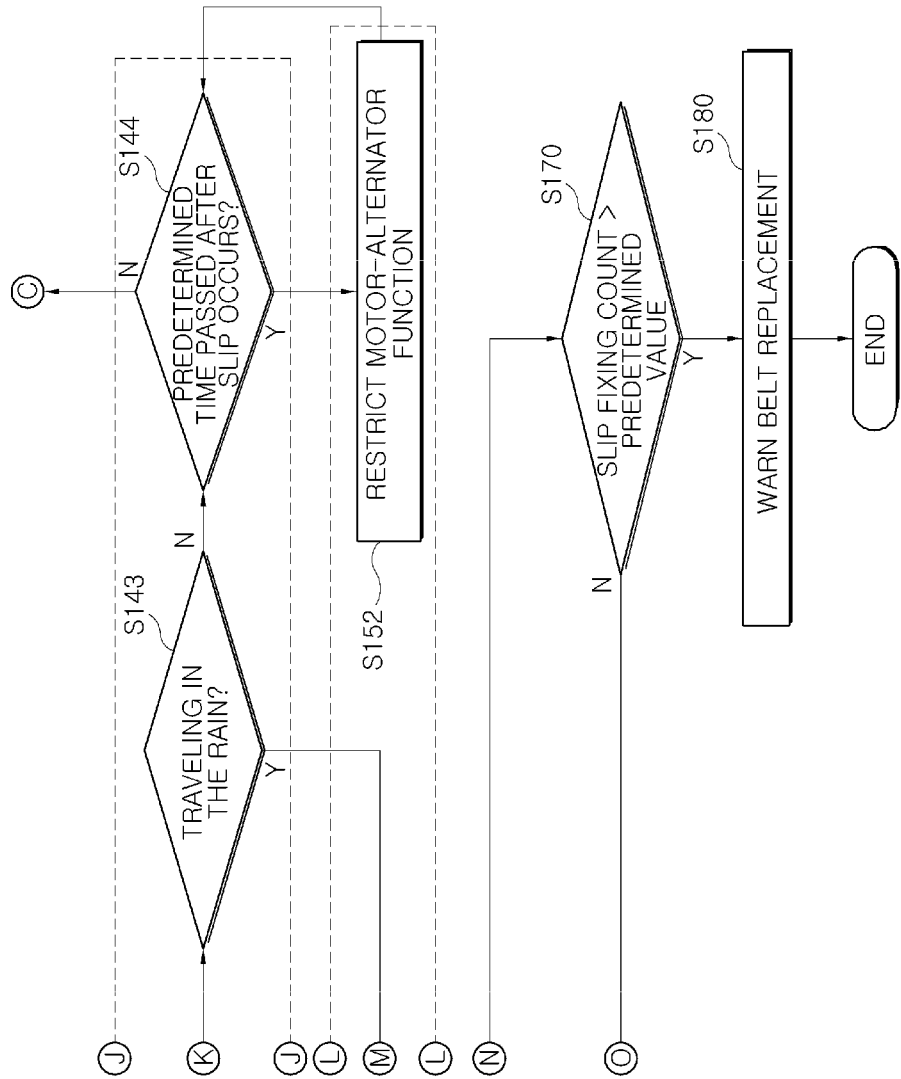

APPARATUS AND METHOD FOR MONITORING BELT SLIP IN BELT-TORQUE ASSISTANCE SYSTEM

CROSS-REFERENCE TO RELATED APPLICATIONS

The present application claims priority to Korean Patent Application Number 10-2011-0121721 filed Nov. 21, 2011, the entire contents of which application is incorporated herein for all purposes by this reference.

BACKGROUND OF THE INVENTION

1. Field of the Invention

The present invention relate to apparatus and method for monitoring belt slip in a belt-torque assistance system using a motor-alternator, particularly apparatus and method for monitoring belt slip in a belt-torque assistance system that restricts the performance of a motor-alternator or alarms belt replacement when belt slips.

2. Description of Related Art

In general, a vehicle using an engine is equipped with a start motor for starting the engine to start the vehicle and an alternator generating power to operate the electronic equipment in the vehicle.

As shown in FIG. 1, a motor-alternator combining the functions of the motor and the alternator is used. The motor-alternator 14 not only starts an engine 11 or generates power for electronic components 18, but assists torque of engine 11 in connection with engine 111 by a belt 15 or operates for regenerative braking.

The configuration of a vehicle equipped with motor alternator 14 is briefly described. The driving power generated from engine 11 is transmitted to a driving wheel 13 through a transmission 12, engine 11 is connected to motor-alternator 14 by belt 15, and motor-alternator 14 is electrically connected to an energy storage 19, such as a battery, or a DC/DC converter 17 and electronic components 18 in vehicle, through an inverter 16.

The engine and motor-alternator are connected through belt 15, such that when belt 15 slips, a predetermined function may not be implemented or some components may be damaged.

That is, when slip occurs between belt 15 and engine 11 or belt 15 and motor-alternator 14, it is difficult to precisely transmit torque, noise is generated, and belt 15 is damaged, which influences traveling of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing apparatus and method for monitoring belt slip of a belt-torque assistance system that restricts the performance of a motor-alternator when sensing slip, by sensing slip of a belt transmitting driving power between the motor-alternator and an engine, in a vehicle equipped with the motor-alternator.

Various aspects of the present invention are directed to providing apparatus and method for monitoring belt slip of a belt-torque assistance system that can alarms replacement of a belt, when the belt slips at or more of a predetermined number of times, by counting the number of times or more of slip of the belt.

An exemplary embodiment of the present invention provides an apparatus for monitoring belt slip in a belt-torque assistance system, which assists torque of an engine by transmitting a driving force of a motor-alternator to the engine through a belt, including a motor-alternator slip control unit that determines whether the belt connecting the motor-alternator with the engine in accordance with driving modes of a vehicle slips, and restricts operation of the motor-alternator in accordance with the slip of the belt, an ECU that outputs the operation state of the engine to the motor-alternator slip control unit, an inverter that changes an alternate current generated from the motor-alternator into a direct current or a direct current into an alternate current to drive the motor-alternator, and outputs a signal according to the speed of a rotor and power generation load to the motor-alternator slip control unit, and a motor-alternator operation control unit that operates the motor-alternator to generate power from the driving power transmitted from the engine and to assittorque of the engine.

The motor-alternator slip control unit may further include a rain sensor that senses rain to determine slip of the belt in the rain.

The apparatus may further include an instrument panel that outputs a warning message when the motor-alternator slip control unit determines that the time of replacing the belt is reached.

Another exemplary embodiment of the present invention provides a method of monitoring belt slip in a belt-torque assistance system, including a driving mode determination step that determines which one of a starting mode, an engine torque assisting mode, a regenerative braking mode, and a power generation mode is the driving mode of a vehicle, a slip determination step that determines whether slip occurs by determining whether the vehicle is driven in a predetermined driving condition in accordance with the driving mode of the vehicle determined in the driving mode determination step, slip sensing step that senses slip of the vehicle when the vehicle is driven in a condition where slip occurs in the slip determination step, a slip condition determination step that compares the predetermined condition to fix the slip after the slip sensing step, and a motor-alternator function restriction step that restricts the function of the motor-alternator, when it is determined that slip occurs in the slip condition determination step.

The motor-alternator function restriction step may include a first motor-alternator function restriction step that restricts the function of the motor-alternator when the number of times of sensed slip is above a predetermined value in the slip condition determination step and the total traveling distance of a vehicle is above a predetermined value, or restricts the function of the motor-alternator, when it is determined that the vehicle travels in the rain even if the total traveling distance of the vehicle is the predetermined value or less, and a second motor-alternator function restriction step that restricts the function of the motor-alternator, when a predetermined time may have passed after slip occurs even if the vehicle does not travel in the rain.

After the second motor-alternator function restriction step is performed, the second motor-alternator function restriction step may be repeated when a predetermined time may have passed after slip occurs, or the second motor-alternator function restriction step may returns to the first process when the predetermined time may have not passed after slip occurs.

After the first motor-alternator function restriction step, a slip fixing step that fixes the slip of the belt and records the number of times of accumulated slips of the belt may be performed.

The method may further include a slip fixing count comparing step that determines whether the number of times of accumulated slips in the slip fixing step is above a predetermined value, and a belt replacement informing step that shows belt replacement on the instrument panel of the vehicle, when the number of times of accumulated slips is above a predetermined value in the slip fixing step.

According to the apparatus and method for monitoring belt slip in a belt-torque assistance system having the configuration, it is possible to sense slip of a belt transmitting power between a motor-alternator and an engine in accordance with the driving modes, and stably drive the vehicle by restricting the function of the motor-alternator when sensing slip of the belt.

Further, it is possible to let a driver know that the time of replacing the belt is reached, when slip of the belt occurs above a predetermined number of times, by counting the number of times of the slip of the belt and informing the number through the instrument plane.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 3A to 3D are flowcharts illustrating a method of monitoring belt slip in a belt-torque assistance system in an exemplary embodiment of the present invention.

Figure 1:
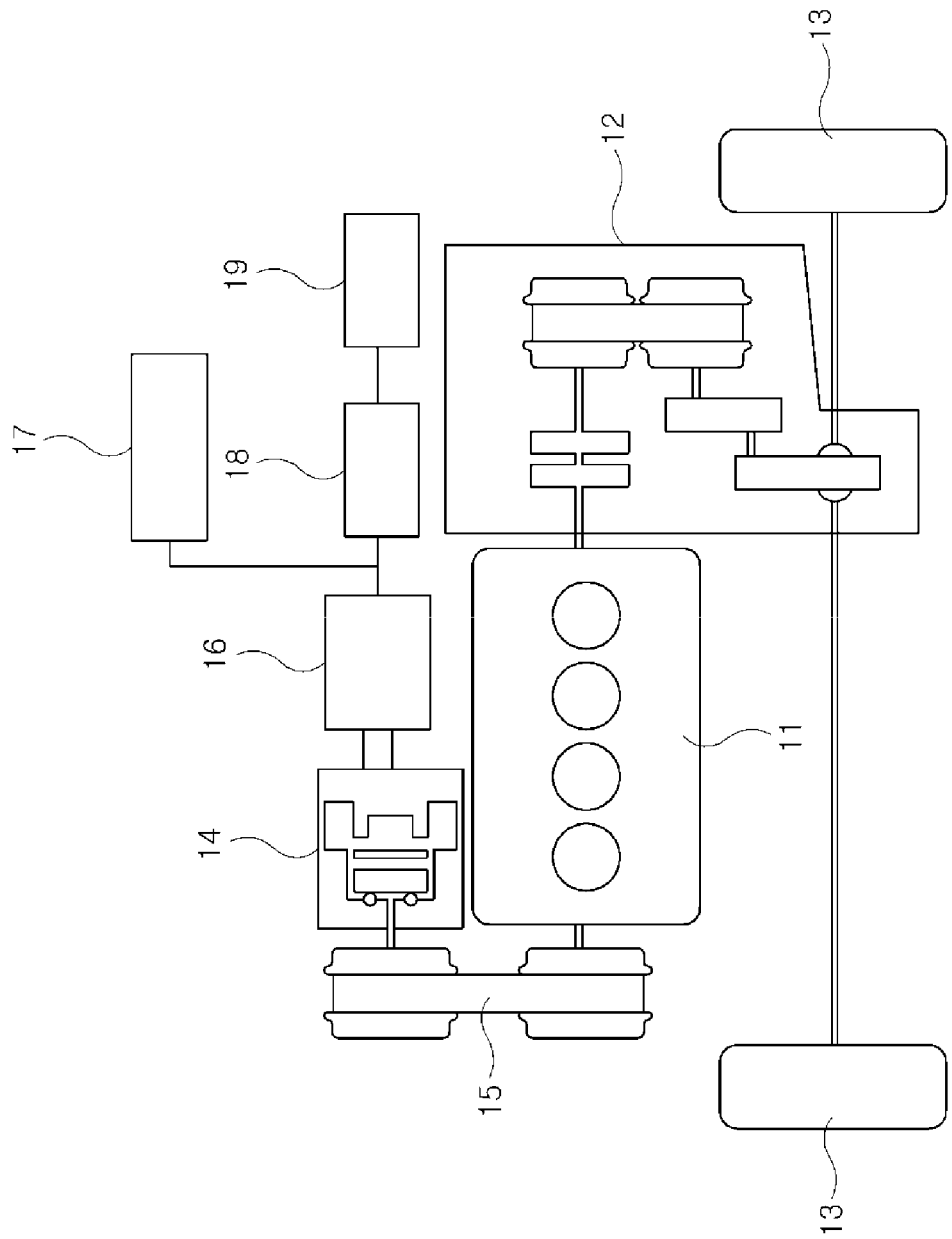
FIG. 1 is a schematic view showing a common belt-torque assistance system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An apparatus for monitoring belt slip in a belt-torque assistance system of the present invention is described in detail with reference to the accompanying drawings.

Figure 2:
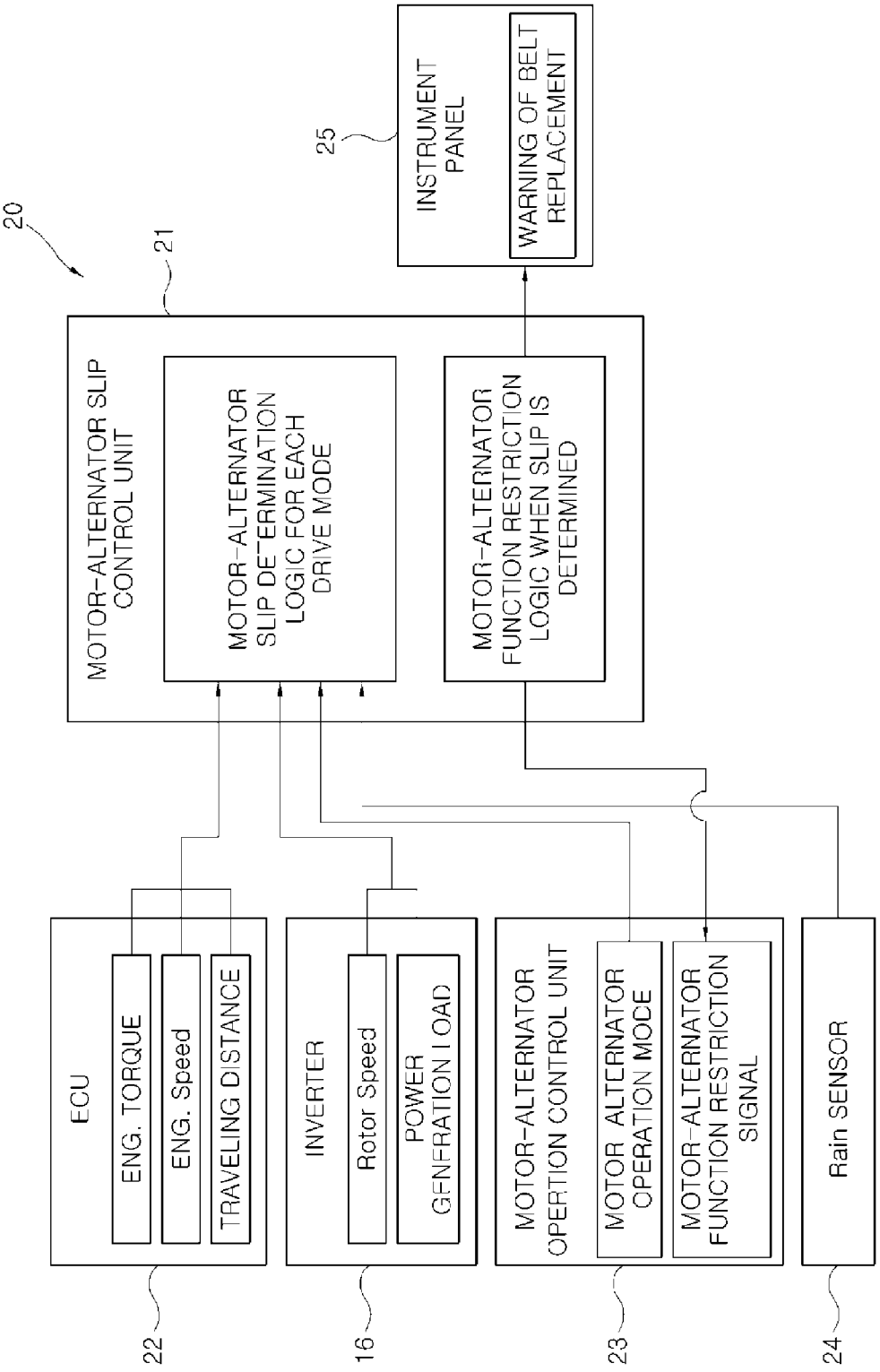
FIG. 2 is a block diagram showing an apparatus for monitoring belt slip in a belt-torque assistance system in an exemplary embodiment of the present invention.

An apparatus for monitoring belt slip in a belt-torque assistance system 20 of the present invention is, as shown in FIG. 2, applied to a system that assists torque of an engine 11, using a motor-alternator 14, and includes an ECU 22, a motor-alternator operation control unit 23, a rain sensor 24, and an instrument panel 25, around a motor-alternator slip control unit 21.

Motor-alternator slip control unit 21 largely has two logics therein, which are a slip determination logic that determines slip between motor-alternator 14 and a belt 15 from ECU 22, an inverter 16, motor-alternator operation control unit 23, and rain sensor 24, which are described below, in accordance with the driving mode of the vehicle, and a function restriction logic that restricts operation of motor-alternator 14 when the slip determination logic determines that belt 15 slips.

Therefore, motor-alternator slip control unit 21 indirectly senses and determines slip of belt 15, and restrict the operation of motor-alternator 14 such that belt 15 does not slip, when belt 15 slips, in a belt torque assistance system of a vehicle.

In particular, in an exemplary embodiment of the present invention, the difference of speed of motor-alternator 14 and engine 11 is used as the reference of determining slip of belt 15. The physical phenomenon shown when belt 15 slips is noise and a speed change. When belt 15 slips, noise is generated by friction between a pulley and belt 15 and driving power is not precisely transmitted, such that a corresponding speed difference is generated. In the exemplary embodiment, a speed change is used as the reference of determining slip of belt 15, and slip of belt 15 is sensed by using a speed difference between engine 11 and motor-alternator 14, and from which control is performed to prevent slip.

ECU 22 senses the toque and speed of engine 11 and the traveling distance of the vehicle and uses them for controlling slip of belt 15.

Inverter 16 is used for measuring a rotor and a power generation load of inverter 16, when sensing slip of belt 15, in addition to the basic functions of inverter 16. The speed of the rotor and power generation load outputted from inverter 16 are outputted to motor-alternator slip control unit 21 such that motor-alternator slip control unit 21 determines slip.

Motor-alternator operation control unit 23 outputs the speed of motor-alternator 14 to motor-alternator slip control unit 21, and restricts motor-alternator 14 to perform only the function of generating power for the minimum electronic equipment for traveling of the vehicle, when motor-alternator slip control unit 21 determines that belt 15 slips.

Slip of belt 15 is generated usually by the speed difference between engine 11 and motor-alternator 14, but it is also generated when the friction coefficient of belt 15 is decreased by inflow of water, such that it is preferable to consider rain, including rain sensor 24 for accurate determination.

When the number of times of slip of belt 15 is accumulated while the vehicle travels, it also influences on the life span of belt 15, such that instrument panel 25 may be equipped with a warning light for a driver to know the time of replacing belt 15.

Figure 3A:
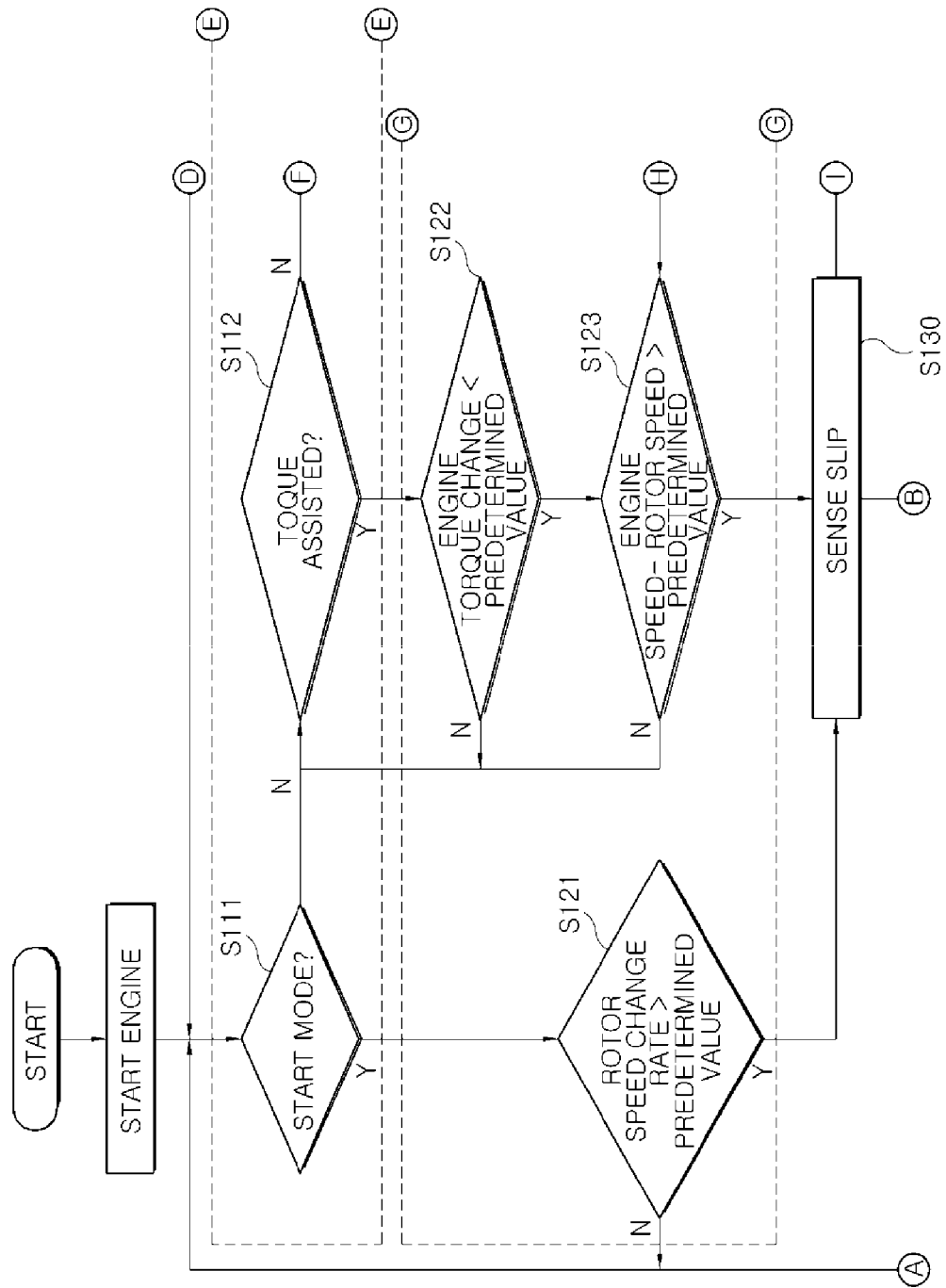

A method of monitoring belt slip in a belt-torque assistance system of the present invention is described with reference to FIGS. 3A and 3B.

A method of monitoring belt slip in a belt-torque assistance system of the present invention is performed by the apparatus for monitoring belt slip in a belt-torque assistance system and includes: a driving mode determination step (S110) that determines which one of a starting mode, an engine torque assisting mode, a regenerative braking mode, and a power generation mode is the driving mode of a vehicle, a slip determination step (S120) that determines whether slip occurs by determining whether the vehicle is driven in a predetermined driving condition in accordance with the driving mode of the vehicle determined in the driving mode determination step (S110), a slip sensing step (S130) that senses slip of the vehicle when the vehicle is driven in a condition where slip occurs in the slip determination step (S120), a slip condition determination step (S140) that compares the predetermined condition to fix the slip after the slip sensing step (S130), and a motor-alternator function restriction step (S150) that restricts motor-alternator 14 to perform only the function of generating power for the minimum electronic equipment for traveling of the vehicle, when it is determined that slip occurs in the slip condition determination step (S140).

The driving mode determination step (S110) determines that motor-alternator 14 starts the engine (S111), motor-alternator 14 assists torque for accelerating the vehicle (S112), motor-alternator 14 generates power by using braking force (S113), or motor-alternator 14 generates power for the electronic equipment of the vehicle, by checking the state of the vehicle (S114). Since ECU 22 controls the entire vehicle, it is possible to directly receive the driving mode from ECU 22 and motor-alternator slip control unit 21 can determine the driving mode on the basis of signals inputted from ECU 22, inverter 16, and motor-alternator 14.

After the driving mode determination step (S110), it is determined whether belt 15 slips (S120). The slip determination step (S120) determines whether belt 15 slips, on the basis of the conditions corresponding to the driving modes.

First, when driving mode determination step (S110) determines that it is a starting mode (S111), slip of belt 15 is determined through a rotor speed change rate comparing step (S121). Since it is necessary to generate the maximum torque for a short time in order to allow motor-alternator 14 to operate engine 11 when stopped engine 11 is started, a large speed difference is generated between motor-alternator 14 and engine 11 and the rotor speed of motor-alternator 14 becomes irregular by the change in torque. The speed change of the rotor depends on engines and auxiliary systems, and it is possible to determine that belt 15 slips, when the speed difference is a predetermined value or more. For example, in general, it is possible to determine that belt slips, in an engine of 1.6 L, when the speed difference is 100 rpm or more with reference to Peak to Peak.

The torque assistance mode is when motor-alternator 14 assists torque for engine 11, such as rapid acceleration of the vehicle, in which slip is determined by comparing the engine torque change rate with a predetermined value (S122) and the speed difference of engine 11 and the rotor with a predetermined value (S123). When motor-alternator 14 operates in the torque assistance mode, the torque of engine 11 is larger than the torque of motor-alternator 14, such that unless there is a rapid change in torque of engine 11, even if belt 15 slips, only a speed difference between engine 11 and motor-alternator 14 is generated without generating oscillation of the rotor speed due to the torque change of motor-alternator 14. Therefore, in the torque assistance mode, it is determined that motor-alternator 14 operates in the torque assistance mode, when the torque change of engine 11 is under a predetermined value (S122) and the speed difference between engine 11 and the rotor is above a predetermined value (S123).

Similarly, in the regenerative braking mode, since there is not change in torque of engine 11, a speed difference is generated between engine 11 and motor-alternator 14 where slip occurs. Therefore, in the regenerative braking mode determination step (S113), it is determined that motor-alternator 14 operates in the regenerative braking mode, when the speed difference between engine 11 and the rotor is above a predetermined value (S123).

On the other hand, when motor-alternator 14 operates in the torque assistance mode and the regenerative braking mode, it is possible to determine that it is slip when there is a speed difference of 4 to 6% or more with respect to the speed of engine 11.

Since when motor-alternator 14 generates power by a power generation mode, the amount of load of the power generation changes, when belt 15 slips, the speed difference between engine 11 and motor-alternator 14 is not constant. Therefore, slip can be determined, when the change rate of the rotor speed is larger than the set value for each power generation load, by comparing the change rate of the rotor speed with the set value for each power generation load, in the power generation mode (S124).

The slip sensing step (S130) recognizes that belt 15 slip, when the condition where slip occurs is satisfied, in accordance with the condition of slip determination step (S120) according to each driving mode.

That is, it is sensed that slip occurs, when the change rate of the rotor speed is above a predetermined value in the start mode, when the change of engine torque is under a predetermined value and the speed difference of engine 11 and the rotor is above a predetermined value in the torque assistance mode, when the speed difference of engine 1 and the rotor is above a predetermined value in the regenerative braking mode, and when the change rate of the rotor speed is above a predetermined value for each power generation load in the power generation mode.

The slip condition determination step (S140) is performed, after the slip sensing step (S130) senses slip of belt 15. It is determined to whether to finally fix slip of belt 15 in slip condition determination step (S140) on the basis of the number of times of slip, the traveling distance, the weather conditions, and the slip passing time.

For example, when the number of times of slip of belt 15 is above a predetermined value in a slip count comparing step (S141) and the total traveling distance of the vehicle exceeds a predetermined distance in a traveling distance comparing step (S142) after the slip count comparing step (S141), driving power transmission between motor-alternator 14 and engine 11 is not smoothly performed due to the slip of belt 15.

Therefore, when it is determined that the number of times of slip is above a predetermined value and the traveling distance is above a predetermined value, a first motor-alternator function restriction step (S151) that restricts the function of motor-alternator 14 through motor-alternator operation control unit 23 is performed.

On the other hand, when the traveling distance of the vehicle is not above the predetermined value in the traveling distance comparing step (S142), an in-rain-traveling determination step (S143) that determines whether the vehicle travels in the rain is performed. Since the friction coefficient of belt 15 decreases when water flows into the vehicle that is traveling from the outside due to the rain, belt 15 slips, and when it is determined that it is raining by rain sensor 24, the first motor-alternator function restriction step (S151) that restricts the function of motor-alternator 14 is performed.

When it is determined that it does not rain in the in-rain-traveling determination step (S143), a slip traveling determination step (S144) is performed. The slip traveling determination step (S144) determines that a predetermined time has passed after the slip is generated.

If it is determined that a predetermined time has passed after the slip is generated in the slip traveling determination step (S144), it is necessary to restricts the function of motor-alternator 14, such that a second motor-alternator function restriction step (S152) is performed, or not, the process returns to the first step. The process returns to the slip traveling determination step (S144) after the second motor-alternator function restriction step (S152) is performed and the time pass after the slip is generated is monitored.

Dividing the motor-alternator function restriction step (S150) that restricts the function of the motor-alternator 14 by using motor-alternator operation control unit 23 into the first motor-alternator function restriction step (S151) and the second motor-alternator function restriction step (S152) is for restricting the function of motor-alternator 14 with respect to continuous slip of belt 15 in the first motor-alternator function restriction step (S151) and for restricting the function of motor-alternator 14 with respect temporary slip of belt 15 in the second motor-alternator function restriction step (S152).

A slip fixing step (S160) is performed after the motor-alternator function restriction step (S150), particularly, the first motor-alternator function restriction step (S151) is performed. Belt 15 has slipped by various conditions when the first motor-alternator function restriction step (S151) is performed, such that it is finally fixed that belt 15 has slipped and the count of slip of belt 15 of a counter recording the number of times of slip of belt 15 is increased.

A slip fixing count comparing step (S170) determines whether the count increased by the fixing in the slip fixing step (S160) exceeds a predetermined value.

When the slip fixing count recorded by the counter is above a predetermined value in the slip fixing count comparing step (S170), it means that the time for replacing belt 15, which is set in advance, is reached, therefore, a belt replacement informing step (S180) is performed for the driver to recognize that the time has been reached.

That is, a warning light of instrument panel 25 is turned on in the belt replacement informing step (S180), such that the driver can recognize that life span of belt 15 has finished and replace the exhausted belt 15.

Meanwhile, when belt 15 is replaced, the recorded contents, particularly, the number of times of slip of belt 15 which is recorded on the counter is initialized (S190) and the process returns to the first step.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of monitoring belt slip in a belt-torque assistance system, comprising:
   a driving mode determination step that determines which one of a starting mode, an engine torque assisting mode, a regenerative braking mode, and a power generation mode is a driving mode of a vehicle based on signals inputted from an Engine Control Unit (ECU), an inverter, and/or a motor-alternator, or receives the driving mode of the vehicle from the ECU;
   a slip determination step that determines, using a motor-alternator slip control unit, whether the belt slip occurs by determining whether the vehicle is driven in a predetermined driving condition in accordance with the driving mode of the vehicle determined in the driving mode determination step;
   a slip sensing step that senses the belt slip of the vehicle when the vehicle is driven in a condition where the belt slip occurs in the slip determination step;
   a slip condition determination step that compares the predetermined driving condition with a number of times of slip, a traveling distance, a weather condition, and/or a slip passing time to decide the belt slip to fix the belt slip after the slip sensing step; and
   a motor-alternator function restriction step that restricts the function of the motor-alternator through a motor-alternator operation control unit, when the belt slip occurs in the slip condition determination step,
   wherein the motor-alternator function restriction step includes:
   a first motor-alternator function restriction step that restricts the function of the motor-alternator when the number of times of sensed belt slip recorded in a counter is above a first predetermined value in the slip condition determination step and a total traveling distance of the vehicle is above a second predetermined value, or restricts the function of the motor-alternator when the vehicle travels in the rain sensed by a rain sensor even if the number of times of sensed slip is above the first predetermined value in the slip condition determination step and the total traveling distance of the vehicle is the second predetermined value or less; and
   a second motor-alternator function restriction step that restricts the function of the motor-alternator, when a predetermined time has passed after the belt slip occurs even if the number of times of sensed slip is above the first predetermined value in the slip condition determination step, the total traveling distance of the vehicle is the second predetermined value or less, and the vehicle does not travel in the rain.

2. The method as defined in claim 1, wherein after the second motor-alternator function restriction step is performed, the second motor-alternator function restriction step is repeated when the predetermined time has passed after the belt slip occurs, or the second motor-alternator function restriction step returns to the driving mode determination step when the predetermined time has not passed after the slip occurs.

3. The method as defined in claim 1, wherein after the first motor-alternator function restriction step, a slip fixing step that fixes the belt slip and records the number of times of accumulated slips of the belt is performed.

4. The method as defined in claim 3, further comprising;
   a slip fixing count comparing step that determines whether the number of times of accumulated slips in the slip fixing step is above a predetermined value; and
   a belt replacement informing step that shows belt replacement by turning on a warning light on an instrument panel of the vehicle, when the number of times of accumulated slips is above the predetermined value in the slip fixing count comparing step.

5. The method as defined in claim 1,wherein when the driving mode determination step determines that the driving mode of the vehicle is the starting mode and a rotor speed change rate is larger than a predetermined value, the belt slip is determined to occur.

6. The method as defined in claim 1, wherein when the driving mode determination step determines that the driving mode of the vehicle is the engine torque assisting mode and a torque change of an engine is under a predetermined value and a speed difference between the engine and a rotor is above a predetermined value, the belt slip is determined to occur.

7. The method as defined in claim 1, wherein when the driving mode determination step determines that the driving mode of the vehicle is the regenerative braking mode and a speed difference between an engine and a rotor is above a predetermined value, the belt slip is determined to occur.

8. The method as defined in claim 1, wherein when the driving mode determination step determines that the driving mode of the vehicle is the power generation mode and a change rate of a rotor speed is larger than a set value for each power generation load, the belt slip is determined to occur.

* * * * *